United States Patent [19] [11] 3,987,432
Yamauchi et al. [45] Oct. 19, 1976

[54] OPERATION STATE DISPLAY APPARATUS

[75] Inventors: Nobuharu Yamauchi; Masaji Matsumura; Katsuhide Morimoto, all of Amagasaki, Japan

[73] Assignee: Mitsubishi Denki Kabushiki Kaisha, Tokyo, Japan

[22] Filed: Feb. 11, 1975

[21] Appl. No.: 548,926

[30] Foreign Application Priority Data

Feb. 25, 1974 Japan ............................... 49-22657
Feb. 27, 1974 Japan ............................... 49-23584

[52] U.S. Cl. ........................ 340/324 A; 340/213 Q; 340/324 AD

[51] Int. Cl.² ......................................... G06K 15/20

[58] Field of Search ...... 340/324 AD, 324 A, 213 Q

[56] References Cited

UNITED STATES PATENTS 2,985,368 5/1961 Kohler et al. .................. 340/213 Q
3,522,597 8/1970 Murphy ......................... 340/324 A
3,818,474 6/1974 Kurner et al. ............... 340/324 AD

*Primary Examiner*—David L. Trafton
*Attorney, Agent, or Firm*—Oblon, Fisher, Spivak, McClelland & Maier

[57] ABSTRACT

An operation state display apparatus is disclosed having a first memory device for memorizing a time from an operation initiation reference time when an input signal is switched from the ON state to the OFF state or from the OFF state to the ON state wherein each input signal is for each operation state of a controlled object. A second memory device is provided for memorizing a last time of the OFF state or the ON state after switching from the ON state to the OFF state or from the OFF state to the ON state as the time from the operation initiation reference time. The apparatus includes a display device for displaying the operation state of the controlled object depending upon the data of the first and second memories in the form of a time chart.

3 Claims, 8 Drawing Figures

OPERATION STATE DISPLAY APPARATUS

BACKGROUND OF THE INVENTION

1. Field of the Invention

The present invention relates to an operation state display apparatus for displaying the operation state of a controlled object.

2. Description of the Prior Art

Heretofore, in sequential control equipment for repeating certain controls in a predetermined order for each constant period, it has been quite hard to find the state of work for a machine during one operation step or the order and course of the ON state or the OFF state of control elements such as a limit switch, a solenoid valve, etc. from one operation initiation time to the present. Accordingly, the maintenance of the control system has been difficult if the operation is stopped by certain abnormal operations of the controlled object.

If it is possible to find the information of reference operation of the controlled object and the information of operation from the operation step initiation to the present by certain means when an abnormal operation is caused, the abnormal operation of the machine can be found at an early stage by comparing both of the informations whereby the machine can be stopped before serious damage of the controlled object, the cause of the abnormal operation can be detected, and a repair of the normal operation of the machine can be made at an early stage to increase the operation rate of the machine.

SUMMARY OF THE INVENTION

The present invention is to overcome this difficulty and an object of the invention is to provide a display system for automatically monitoring the operation of a controlled object such as the ON state, the OFF state or the ON-OFF state of a control element such as a limit switch, a solenoid valve, etc., and for displaying the operation state on a cathode-ray tube display device or other display device in the form of a time chart whereby the position of the operation during one operation step period can be found as well as the period of the operation, etc. and for also finding information concerning the cause of abnormal operation from the old operation states, at an early state, if the operation of the machine is abnormal such as a cessation of control.

It is another object of the invention to provide an operation state display apparatus which has a relatively simple structure and whose response speed is quite high because it displays the operation state by memorizing the operation state of the controlled object using first and second memories having similar function such as registers.

Another object of the invention is to provide an operation state display apparatus for displaying not only the actual operation state but also a reference operation state of the controlled object on a display device in the form of a time chart whereby the position of the operation during one operation step period, the period of the operation, etc. can be found together with the reference operation state, and whereby information concerning the cause of abnormal operation from the reference operation states can be found at an early state if the operation of the machine is abnormal such as a cessation of control.

The foregoing and other objects are attained in accordance with one aspect of the present invention through the provision of an operation state display apparatus comprising a first memory device for memorizing a time from an operation initiation reference time when an input signal is switched from the ON state to the OFF state or from the OFF state to the ON state wherein each input signal is for each operation state of a controlled object; a second memory device for memorizing a last time of the OFF state or the ON state after switching from the ON state to the OFF state or from the OFF state to the ON state as the time from the operation initiation reference time; and a display device for displaying the operation state of said controlled object depending upon the data of the first and second memories in the form of a time chart.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
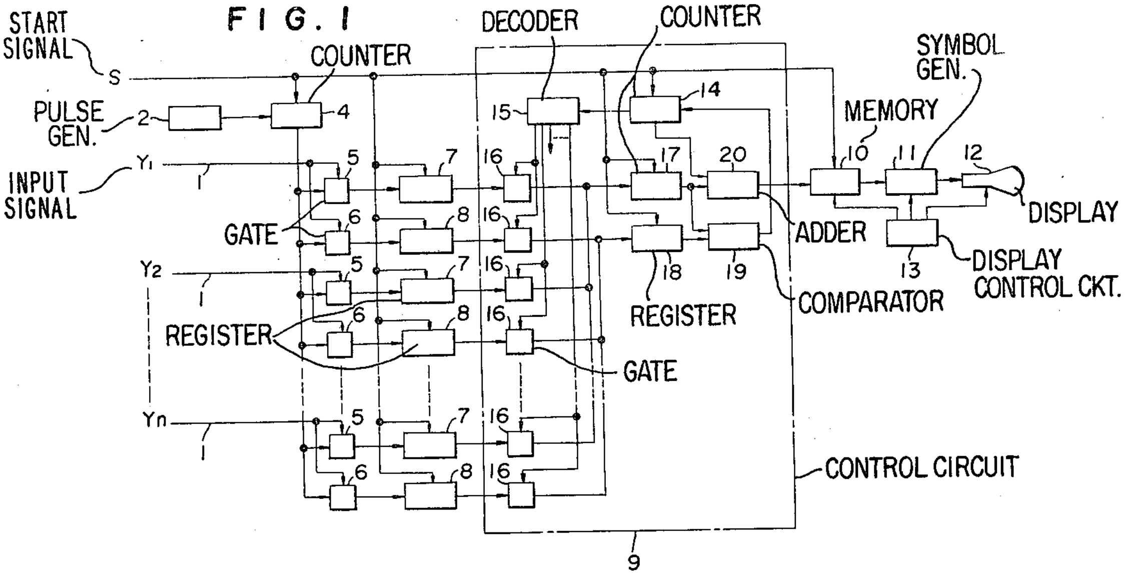
FIG. 1 is a block diagram of a first embodiment of the invention.

Referring now to the drawings, wherein like reference numerals designate identical or corresponding parts throughout the several views, and more particularly to FIG. 1 thereof, one embodiment of the invention will be described. In FIG. 1, the reference numeral 1 designates an input signal for showing the state of operation of the the controlled object such as a limit switch, a solenoid valve, etc.. In this embodiment, the dots of the input signals are *n* and the input signals are designated as $Y_1, Y_2 \ldots Y_n$.

The reference numeral 2 designates a pulse generator circuit for generating pulse trains having a constant period; S designates a start signal for application at the initiation of one operation step of the controlled object; 4 designates a counter circuit; 5 and 6 designate gate circuits; 7 and 8 designate registers; 9 designates a control circuit which comprises counter circuits 14, 17, a decoder 15, a gate circuit 16, a register 18, a comparator 19 and an adder 20. The reference numeral 10 designates a memory; 11 designates a symbol generator; 12 designates a display and 13 designates a display control circuit.

In order to illustrate the embodiment so as to be easily understood, assume that the ON state of each input signal during one operation step of the controlled object is one and the ON state of the input signal is monitored as the operation state. When the start signal S is transmitted from the controlled object, the counter circuit 4 and the registers 7, 8 are reset and the memory 10 is cleared. Then, the counter circuit 4 sequentially counts the pulse trains from the pulse generating circuit 2.

When the input signal $Y_1$ is switched from the OFF state to the ON state, the gate circuit 5 to $Y_1$ is turned off and the data of the counter circuit 4 is stored in the register 7 corresponding to $Y_1$. The gate circuit 5 is turned off only when the input signal $Y_1$ is switched from the OFF state to the ON state whereby the data of the counter circuit 4 is stored in the register 7 which is not operated during the period of the ON state or the OFF state or during the time of switching from the ON state to the OFF state.

On the other hand, the gate circuit 6 is in the OFF state when the input signal $Y_1$ is in the ON state whereby the data of the counter circuit 4 are continuously stored. Likewise, the gate circuits 5, 6 and the registers 7, 8 are operated by the input signals $Y_2 \ldots Y_n$.

In accordance with the operation, the data of the register 7 shows, in equivalent, the time turned on after applying the start signal S of the input signal 1 thereof and the data of the register 8 shows, in equivalent, the last time of the ON state of the input signal 1 after applying the start signal S when the input signal 1 is turned off. The control circuit 9 transmits the data of the registers 7, 8 for the input signal to the memory 10 in a constant period or at random whereby a desirable display symbol code is recorded in the memory address corresponding to the input signal.

The memory 10 has a memory capacity substantially equal to the symbol numbers capable of display 12 and can record the data and can read out the data as desired. The old data are kept in the memory except for recording new data in the same address or clearing the data by a reset signal. The display symbol record recorded in the memory is read out in a constant period and is fed to the symbol generator 11 which is a read-only-memory for converting the codes to a dot matrix such as 5 × 7 dots.

In the order for reading out the dot matrix, all of the data are read out by each five dots of seven raster scans from the top under synchronizing of the raster scans whereby the symbols are displayed on a display 12 such as a cathode-ray tube.

The method of commanding memory address for recording in the memory 10 of the time chart data fed out from the control circuit 9 can be the following.

1. The display panel is divided as a section paper and the symbol position that is the memory address in the sections is commanded in the matrix type of the line position (ordinate) and the column position (abscissa).
2. The serial memory addresses are given to all of the memories and the absolute address is commanded.

In order to simplify the illustration, description will be made of one of the latter methods wherein the display symbol codes are recorded from the memory address which is substantially given by the input signal address and the data of the corresponding register 7 to the memory address which is substantially given by the input signal address and the data of the corresponding register 8.

For example, the case is considered wherein 100–199 addresses are allotted for the input signal $Y_1$, 200–299 addresses are allotted for the input signal $Y_2 \ldots (100 \times n) \sim (100 \times n + 99)$ addresses are allotted for the input signal $Y_n$, the data of the register 7 is 3, the data of the register 8 is 6 for the input signal $Y_1$, the data of the register 7 is 7 and the data of the register 8 is 11 for the input signal $Y_2$. When the data for $Y_1$ is 1 in the counter circuit 14, the output of the counter circuit 14 is decoded by the decoder 15 to turn off the gate circuit 16 for only $Y_1$ and the data of the register 7 is preset in the counter circuit 17 and the data of the register 8 is stored in the register 18. Then, a constant for the counter circuit 14, that is, 100 in the case of $Y_1$ and 200 in the case of $Y_2$ is added to the output of the counter circuit 17 by the adder 20 and the memory address of the memory 10 is commanded by the output and the display symbol code is recorded. After recording the display symbol code in the memory address, [1] is added in the counter circuit 17 and the data are fed to the adder 20 together with the constant and the display symbol code is recorded in tne next memory address. The operation is continued until the data of the counter circuit 17 become higher than the data of the register 18 which is shown by comparison. When the former become higher than the latter, the recording in the memory 10 is stopped, [1] is added in the counter circuit 14, the next input signal $Y_2$ is commanded and the operation is repeated. The display symbol codes are recorded in 103 to 106 addresses for $Y_1$.

The memory allotted addresses for $Y_2$ are 200 to 299 addresses whereby the display symbol codes are recorded in 200 + 7 = 207 to 200 + 11 = 211 addresses. Likewise, the display symbol codes are recorded in the memory 10 depending upon the data of the registers 7 and 8 for each of the input signals $Y_3 \sim Y_n$. After completing the operation for $Y_n$, the counter 4 is automatically reset and the operations for $Y_1$ to $Y_n$ are repeated.

When the frequency of the pulse generator 2 is selected depending upon the maximum symbol number in the horizontal direction of the display 12, the maximum period width for one operation step of the controlled object and the ON period for the input signal, there is no failure when the time chart for the input signal is over the display panel. Further, no disadvantageous effect is given to the time chart for the other input signal.

Figure 2:
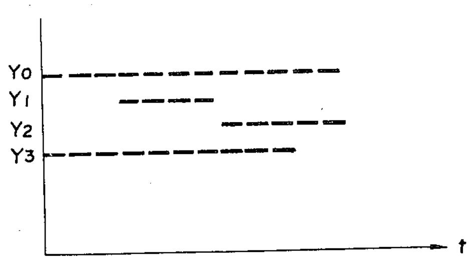
FIG. 2 is a time chart showing one example of the state of operation of the controlled object displayed on the display of FIG. 1.

FIG. 2 is a time chart for the display under the above-mentioned operation. When the frequency of the pulse generator 2 is selected so as to correspond to one display symbol for 1 second and the display line of the display 12 is changed for each of 100 addresses, the period from the initiation of the operation to the present can be found by the data of the counter circuit 4 when the 0–99 addresses of the memory address memory 100 are memory addresses for the chart showing the operation history. The display symbol codes are recorded as 0 addresses to the memory address decided by the data of the counter circuit 4 whereby is it is displayed as $Y_0$. On the other hand, the input signals $Y_1$, $Y_2$ and $Y_3$ which are respectively allotted to the addresses 100–199, 200–299 and 300–399 are displayed as $Y_1$, $Y_2$ and $Y_3$ of FIG. 2.

In FIG. 2, $Y_1$ is turned on at 3 seconds after the start signal S and the ON state is kept for 4 seconds. $Y_2$ is turned on at 7 seconds after the start signal S and the ON state is kept for 5 seconds. $Y_3$ is in the ON state at the start and the ON state is kept for 10 seconds. In this embodiment, the reset of the counter circuit 4, the registers 7, 8 and the memory 10 are carried out by the start signal S. However, it is possible to reset each of the parts by one operation step finish signal or the like. In this embodiment, the input signal is turned on only once during the one operation step. However, it is clear from the illustration of the operation of the registers 7, 8 and the control circuit 9 that the same can be applied for the case repeating more than one of the ON–OFF states of the input signal during one operation step.

In general, the data of the registers 7 and 8 stored during the period of the ON state of the input signal are different during the period and the display symbol codes are recorded or memorized. The memory address of the memory 10 is decided by each of the input signals and the corresponding data of the registers 7, 8. Accordingly, without any disadvantageous affect to the memory data recorded or the memory data for the other input signals, it is possible to display, in normal fashion, the operation state of the input signal which repeats more than one ON–OFF state during the one operation step.

Figure 3:
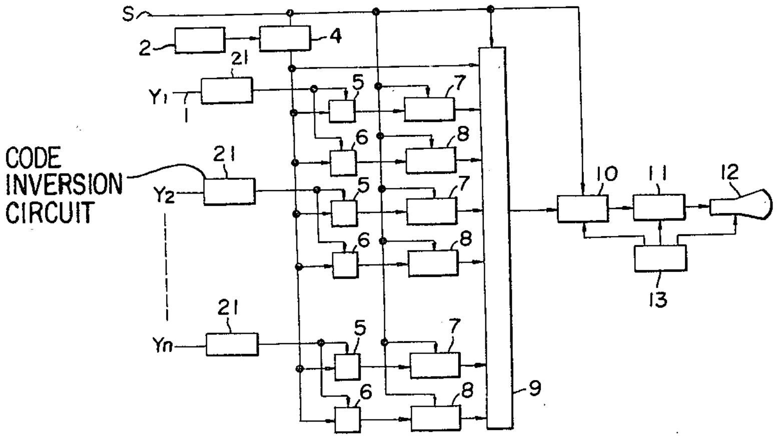
FIG. 3 is a block diagram of a second embodiment of the invention.

FIG. 3 is a block diagram of the second embodiment of the invention which differs from FIG. 1 as follows. A code inversion circuit 21 is connected to the circuit for the input signal 1 whereby the OFF state is monitored and displayed as the operation state of the controlled object. The code inversion circuit 21 provides the output of the OFF state during the ON state of the input signal 1 and the output of the ON state during the OFF state of the input signal.

Figure 4:
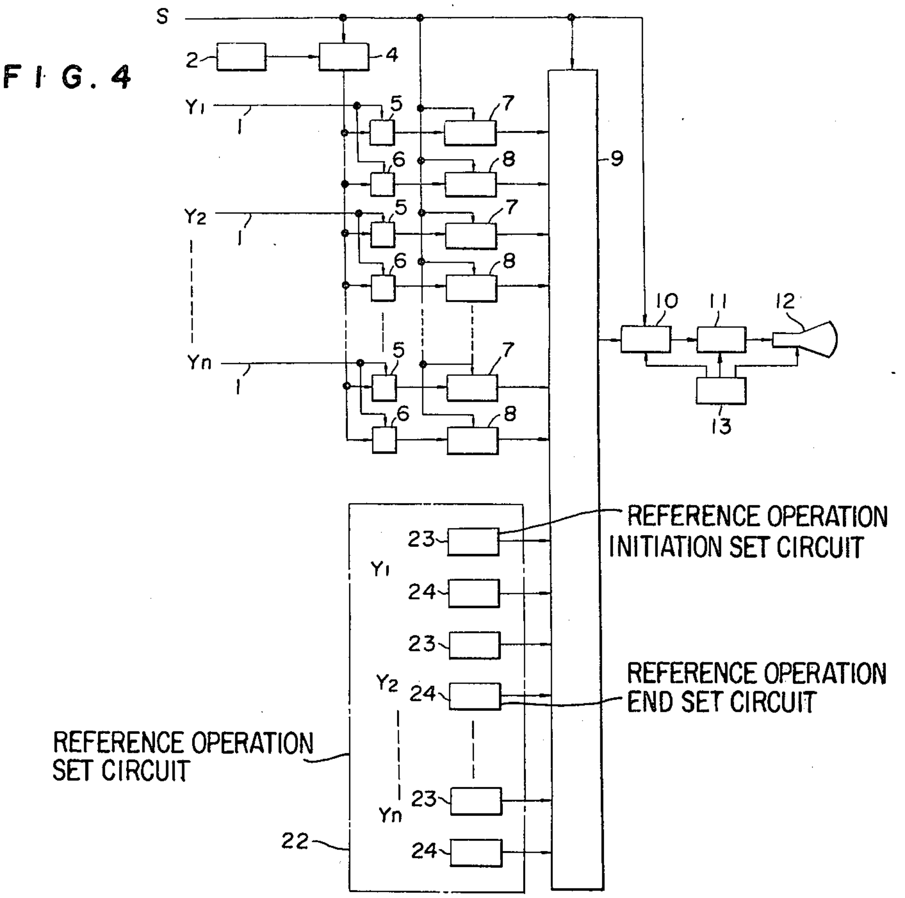
FIG. 4 is a block diagram of a third embodiment of the invention.

Referring to FIG. 4, the third embodiment of the invention will be described. In FIG. 4, the reference numeral 1 designates the input signal for showing the operation state of the controlled object such as a limit switch, a solenoid valve, etc.. In this embodiment, the dots of the input signals are N and the input signals are designated as $Y_1, Y_2 \ldots Y_n$. The reference numeral 2 designates a pulse generator circuit for generating pulse trains having a constant period; S designates a start signal for application at the initiation of one operation step of the controlled object; 4 designates a counter circuit; 5 and 6 designate gate circuits; 7 and 8 designate registers; 9 designates a control circuit; 22 designates a reference operation set circuit which consists of a reference operation initiation set circuit 23 and a reference operation end set circuit 24; 10 designates a memory; 11 designates a symbol generator; 12 a display; and 13 designates a display control circuit.

In the drawing, the same references indicate identical or like parts. In order to illustrate the embodiment so as to be easily understood, assume that the ON state of each input signal during one operation step of the controlled object is one and the ON state of the input signal is monitored as the operation state. When the start signal S is transmitted from the controlled object, the counter circuit 4 and the registers 7 and 8 are reset and the memory 10 is cleared. The reference operation display data corresponding to each of the input signals which are preliminarily set in the reference operation set circuit 22 are recorded in the memory addresses corresponding to the input signals of the memory 10 as desirable reference operation display symbol codes such as code 1.

Figure 5:
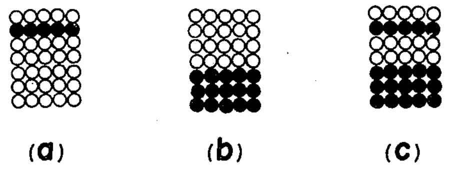
FIG. 5 shows dot matrices read out from the symbol generator of FIG. 4.

The memory 10 has a memory capacity substantially equal to the number of symbols capable of display on the display 12 and can record the data and can read out the data as desired. The old data are kept in the memory except for recording new data in the same address or clearing the data by a reset signal. The display symbol record recorded in the memory is read out in a constant period and is fed to the symbol generator 11 which is read-only-memory for converting the codes to dot matrices such as a 5 × 7 dot matrix as shown in FIG. 5(*a*) in the case of 1 of the display symbol code and in 5(*b*) in the case of 2 of the display symbol code and in FIG. 5(*c*) in the case of 3 of the display symbol code.

In the order for reading out the dot matrix, all of the data are read out by each five dots of the seven raster scans from the top under synchronizing to the raster scans whereby the symbols are displayed on a display 12 such as a cathode-ray tube.

The method of commanding a memory address for recording in the memory 10 of the time chart data fed out from the control circuit 9 can be stated with respect to the first embodiment. In order to simplify the explanation, one of the latter methods will be described wherein the reference operation display symbol codes are recorded from the memory address which is substantially given by the input signal address and the data of the corresponding reference operation initiation set circuit 23 to the memory address which is substantially given by the input signal address and the data of the corresponding reference operation end set circuit 24.

Figure 8:
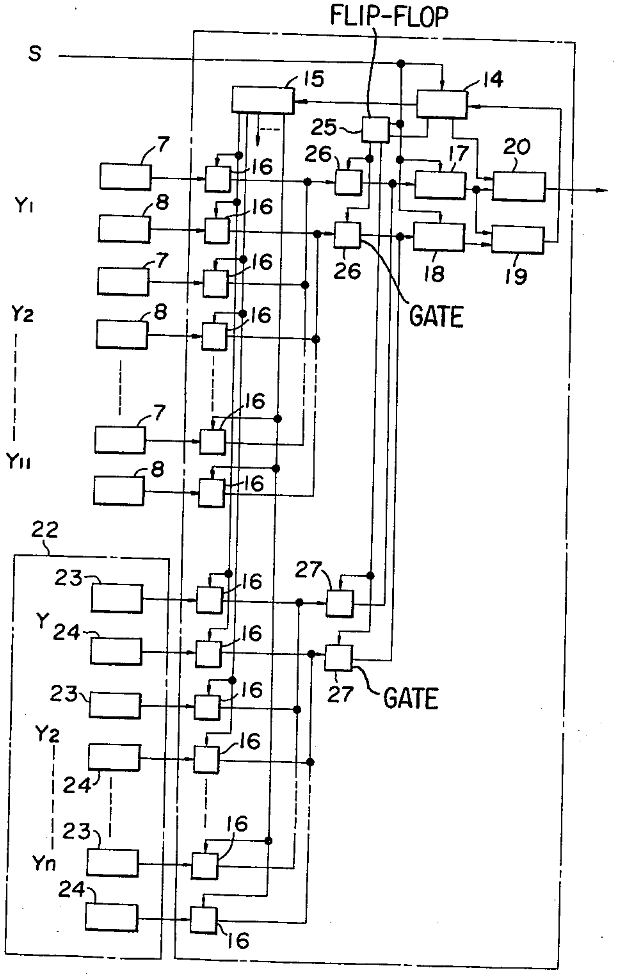
FIG. 8 is a block diagram of one embodiment of the control circuit of FIG. 4.

FIG. 8 is a block diagram of one embodiment of the control circuit 9 wherein the reference numerals 14 and 17 designate counter circuits; 15 designates a decoder; 16 designates a gate circuit; 18 designates a register; 19 designates a comparator; 20 designates an adder; 25 designates a flip-flop circuit 26 and 27 designate gate circuits. For example, the case is considered wherein 100–199 addresses are allotted for the input signal $Y_1$, 200–199 addresses are allotted for the input signal $Y_2 \ldots (100 \times n) \sim (100 \times n + 99)$ addresses are allotted for the input signal $Y_n$, the data of the reference operation initiation set circuit 23 for the input signal $Y_1$ is 0 and that for $Y_2$ is 8, and the data of the reference operation end set circuit 24 for the input signal $Y_1$ is 7 and that for $Y_2$ is 11. The flip-flop 25 is reset by the start signal S and the gate circuit 26 is turned on and the gate circuit 27 is turned off. When the data for $Y_1$ is 1 in the counter circuit 14, the output of the counter circuit 14 is decoded by the decoder 15 to turn off the gate circuit for only $Y_1$ of the reference operation data, the data of the reference operation initiation set circuit 23 is preset in the counter circuit 17 and the data of the reference operation end set circuit 24 is stored in the register 18.

Then, a constant for the counter circuit 14 that is 100 in the case of $Y_1$ and 200 in the case of $Y_2$ is added to the output of the counter circuit 17 by the adder. The memory address of the memory 10 is commanded by the output and the display symbol code is recorded. After recording the display symbol code in the memory address, 1 is added in the counter circuit 17. The data are fed to the adder 20 together with the constant. The reference operation display symbol code is recorded in the next address. The operation is continued until the data of the counter circuit 17 become higher than the data of the register 18. When the former become higher than the latter, the recording in the memory 10 is terminated, 1 is added in the counter circuit 14 the next input signal $Y_2$ is commanded and the operation is repeated. The reference operation display symbol codes are recorded in 100 to 107 addresses for $Y_1$. The memory allotted addresses for $Y_2$ are 200 to 299 whereby the reference operation display symbol codes are recorded in 200 + 8 = 208 to 200 + 11 = 211 addresses.

Figure 6:
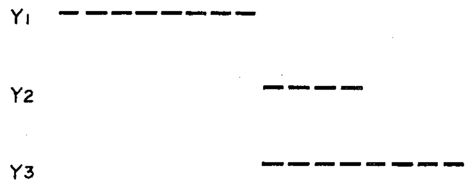
FIG. 6 and FIG. 7 are time charts displayed on the display of FIG. 4.

Likewise, the reference operation display symbol codes are recorded in the memory 10 depending upon the data of the reference operation initiation set circuit 23 and the reference operation end set circuit 24 for each of the input signals $Y_3 \sim Y_n$. As to the results, the time chart of FIG. 6 is displayed on the display 12. After completing the recording of the reference data for $Y_1$–$Y_n$ in the memory 10, the flip-flop 25 is set, the gate circuit 26 is turned off and the gate circuit 27 is turned on.

On the other hand, the display of the actual operation state of the controlled object is carried out as follows. The counter circuit 4 and the registers 7, 8 are reset by the start signal S. Then, the pulse trains output from the pulse generating circuit 2 is sequentially counted by the counter circuit 4. Then, when the input signal $Y_1$ is switched from the OFF state to the ON state, the gate circuit 5 for $Y_1$ is turned off. The data of the counter circuit 4 are stored in the corresponding register 7. The gate circuit 5 is turned off only when the input signal $Y_1$ is switched from the OFF state to the ON state. The data of the counter circuit 4 are stored in the register 7. The storage of the data is not carried out during the period of the ON state or the OFF state of the input signal and the transition time from the ON state to the OFF state. On the other hand, the gate circuit 6 is turned on during the period of the ON state of the input signal $Y_1$ and the data of the counter circuit 4 are continuously stored in the register 8. Likewise, the gate circuits 5, 6 and the registers 7, 8 for each of $Y_2 \ldots Y_n$ are similarly operated.

In accordance with the operation, the data of the register 7 shows in equivalent, the time turned on after applying the start signal S of the input signal 1 thereof and the data of the register 8 shows in equivalent, the last time of the ON state of the input signal 1 after applying the start signal S when the input signal 1 is turned off. The data of the actual operation state given are recorded through the control circuit 9 in the memory 10 as the actual operation display symbol code such as code 2 similar to the recording of the reference operation data for the reference operation set circuit 22.

In the display of the actual operation data, the counter circuit 14 is automatically reset after completing the operation for $Y_1 \sim Y_n$ and the operation for the actual operation data for $Y_1$ is repeated. In the case when new data are recorded in the form of a logical OR of the actual operation display symbol code and the reference operation display symbol code without damage of the old reference operation display symbol code at the same memory address, only the reference operation is given in the case of the code of 1 and only actual operation is given in the case of code 2. Both reference operation and actual operation are given in the case of the code of 3 depending upon the code data of the same memory.

When the dot matrices read out from the symbol generator 11 are changed as in FIGS. 5(*a*), (*b*) and (*c*) depending upon the above-mentioned codes, the display symbols can be selected depending upon the combinations of the actual operation state and the reference operation state. On the other hand, the period from the initiation of operation can be found by the data of the counter circuit 4. Accordingly, when the 0–99 addresses are memory addresses of the memory

10 for the operation period chart, the number of display symbol codes given by the data of the counter circuit 4 are recorded from the 0 address. The state is shown as $Y_0$ in FIG. 4 when the frequency of the pulse generator 2 is selected depending upon the maximum number of symbols displayed in the horizontal direction of the display 12, the maximum period width for one operation step of the controlled object and the ON period for the input signal. There is no failure when the time chart for the input signal is over the display panel. No disadvantageous affect is given to the time chart for the other input signal.

Figure 7:
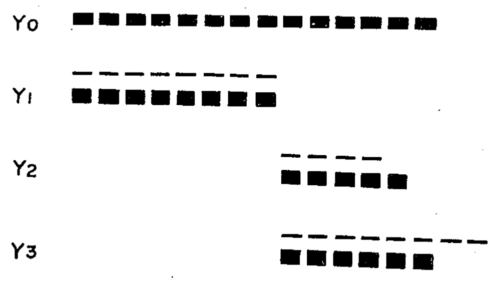

FIG. 7 is a time chart of the display under the above-mentioned operation when the frequency of the pulse generator 2 is selected so as to correspond one display symbol to 1 second, the display line of the display 12 is changed for each of the 100 addresses; the input signal $Y_1$ is in the ON state for both the reference operation state and the actual operation state at the start signal, and the ON state is maintained for 8 seconds. The $Y_2$ in the reference operation is turned on at 8 seconds after the start signal and the ON state is kept for 4 seconds. However, in the actual operation of the controlled object, the $Y_2$ is turned on at 8 seconds after the start signal. However, the ON state is maintained for 5 seconds.

On the other hand, the $Y_3$ in the reference operation is turned on at 8 seconds after the start signal and the ON state is maintained for 8 seconds. However, the $Y_3$ in the actual operation is turned on at 8 seconds after the start signal and the ON state is continued for 6 seconds. In the above-mentioned embodiment, the reference operation display data for the display 12 of the reference operation set circuit 22 are memorized in the memory 10 and the operation state display is carried out by reading out the data of the memory 10. However, it is possible to directly feed the reference operation data to the symbol generator 11 or the display 12 without passing the memory 10. It is also possible to clear only the actual operation state data memorizing region without clearing all of the data of the memory 10 when the start signal S is fed. It is also possible to record a code different from the ON state display symbol code such as a space code, etc., in the region except for the memory region given by the registers 7, 8 and the input point (the region in the OFF state of the input signal) without clearing any memory 10. In the embodiment, the reset of the counter circuit 4, the registers 7, 8 and the memory 10 are carried out by the start signal S. However, it is possible to reset each of the parts by a signal for a one operation step finish or the like.

The embodiment wherein the input signal 1 is turned on only once during the one operation step period will now be described. When the input signal repeats the ON–OFF states during one operation step period, the number of data given by the reference operation set circuit 10 correspond to the combinations of the ON–OFF repeats and the set circuits 23, 24 correspond to the connected combinations whereby the reference operation data for each input signal for each combination are separately and sequentially read out through the gate circuit 16 to the counter circuit 17 and the register 18 and the reference operation display symbol codes are recorded in the memory 10. After completing the operation of all of the reference operation data for each input signal, the data of the counter circuit 14 are operated. Likewise, the reference operation data for $Y_1$–$Y_n$ are operated sequentially. On the other hand, with regard to the actual operation data, the data of the registers 7, 8 recorded are different during the time in the ON state of the input signal. Accordingly, the memory addresses of the memory 10 in which the data are recorded or memorized are decided depending upon each of the signals and the data of the registers 7, 8 thereof. Accordingly, it is possible to display the operation states of the input signals which repeats the ON-OFF states during one operation step period without disadvantageous effect to the old memory data recorded and the memory data for the other input signal.

The cases of monitoring the ON state of the controlled object are shown. However, the OFF state of the controlled object can be monitored and displayed as the operation state by connecting a code inversion circuit for outputting the OFF state during the ON state of the input signal 1 and the ON state during the OFF state of the input signal 1 in the passage of the input signal. The display for the operation state of the controlled object may be a cathode-ray tube. However, it is possible to use a plasma display, a lamp display, a symbol display, e.g. figure display, printer e.g. a typewriter or a line printer as the display.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An apparatus state display apparatus for displaying the operation state of controlled objects comprising:

means for receiving a start signal,
means for receiving a first input signal indicating the state of operation of a first object,
means for receiving a second input signal indicating the state of operation of a second object,
a pulse generator,
a first counter,
a first gate for performing a NAND function,
a second gate for performing a NAND function,
a third gate for performing a NAND function,
a fourth gate for performing a NAND function,
a first register,
a second register,
a third register,
a fourth register,
a fifth gate for performing an AND function,
a sixth gate for performing an AND function,
a seventh gate for performing an AND function,
an eighth gate for performing an AND function,
a decoder,
a second counter,
a third counter,
a fifth register,
an adder,
a comparator,
a memory,
a symbol generator,
a display control circuit,
a display,
means connecting the start signal to a first input of the first counter, to a first input of the second counter, to a first input of the third counter, to a first input of the fifth register and to a first input of the memory,
means connecting the output of the pulse generator to the second input of the first counter,
means connecting the output of the first counter to a first input of the first gate, to a first input of the second gate, to a first input of the third gate and to a first input of the fourth gate,
means connecting the first input signal to a second input of the first gate and to a second input of the second gate,
means connecting the second input signal to a second input of the third gate and to a second input of the fourth gate,
means connecting the output of the first gate to a second input of the first register,
means connecting the output of the second gate to a second input of the second register,
means connecting the output of the third gate to a second input of the third register,
means connecting the output of the fourth gate to a second input of the fourth register,
means connecting the output of the first register to a first input of the fifth gate,
means connecting the output of the second register to a first input of the sixth gate,
means connecting the output of the third register to a first input of the seventh gate,
means connecting the output of the fourth register to a first input of the eighth gate,
means connecting a first output of the decoder to a second input of the fifth gate and to a second input of the sixth gate,
means connecting a second output of the decoder to a second input of the seventh gate and to a second input of the eighth gate,
means connecting the output of the fifth gate to a second input of the third counter,
means connecting the output of the sixth gate to a second input of the fifth register,
means connecting the output of the seventh gate to the second input of the third counter,
means connecting the output of the eighth gate to the second input of the fifth register,
means connecting the output of the third counter to a second input of the adder and to a first input of the comparator,
means connecting the output of the fifth register to a second input of the comparator,
means connecting the output of the comparator to a second input of the second counter,
means connecting a first output of the second counter to the input of the decoder,
means connecting a second output of the second counter to a first input of the adder,
means connecting the output of the adder to a second input of the memory,
means connecting the output of the memory to a first input of the symbol generator,
means connecting a first output of the display control circuit to a third input of the memory,
means connecting a second output of the display control circuit to a second input of the of the symbol generator,
means connecting a third output of the display control circuit to a second input of the display,
means connecting the output of the symbol generator to the display.

2. An operation state display apparatus for displaying the operation state of controlled objects in accordance with claim 1 wherein a code inversion circuit is disposed between the means for receiving the second input signal and the second input of the third gate and the second input of the fourth gate.

3. An operation state display apparatus for displaying the operation state of controlled objects comprising:

means for receiving a start signal, means for receiving a first input signal indicating the state of operation of a first object, means for receiving a second input signal indicating the state of operation of a second object, a first register, a second register, a third register, a fourth register, a fifth register, a sixth register, a first gate for performing an AND function, a second gate for performing an AND function, a third gate for performing an AND function, a fourth gate for performing an AND function, a fifth gate for performing an AND function, a sixth gate for performing an AND function, a seventh gate for performing an AND function, an eighth gate for performing an AND function, a ninth gate for performing an AND function, a tenth gate for performing an AND function, an eleventh gate for performing an AND function, a twelfth gate for performing an AND function, a first reference operation initiation set circuit, a first reference operation end set circuit, a second reference operation initiation set circuit, a second reference operation end set circuit, a decoder, a flip-flop, a counter, an adder, a comparator, a memory, a symbol generator, a display control circuit, a display, means connecting the start signal to a first input of the flip-flop, to a first input of the fifth register, to a first input of the sixth register and to a first input of the counter, means connecting the first input signal to the first register, to the second register, to the first reference operation initiation set circuit and to the first reference operation end set circuit, means connecting the second input signal to the third register, to the fourth register, to the second reference operation initiation set circuit and to the second reference operation end set circuit, means connecting the output of the first register to a first input of the first gate, means connecting the output of the second register to a first input of the second gate, means connecting the output of the third register to a first input of the third gate, means connecting the output of the fourth register to a first register of the fourth gate, means connecting the output of the first reference operation initiation set circuit to a first input of the fifth gate, means connection the output of the first reference operation end set circuit to a first input of the sixth gate, means connecting the output of the second reference operation initiation set circuit to a first input of the seventh gate, means connecting the output of the second reference operation end set circuit to a first input of the eighth gate, means connecting a first output of the decoder to a second input of the first gate, to a second input of the second gate, to a second input of the fifth gate and to a second input of the sixth gate, means connecting a second output of the decoder to a second input of the third gate, to a second input of the fourth gate, to a second input of the seventh gate and to a second input of the eighth gate, means connecting the output of the first gate to a first input of the ninth gate, means connecting the output of the second gate to a first input of the tenth gate, means connecting the output of the third gate to the first input of the ninth gate, means connecting the output of the fourth gate to the first input of the tenth gate, means connecting the output of the fifth gate to a first input of the eleventh gate, means connecting the output of the sixth gate to a first input of the twelfth gate, means connecting the output of the seventh gate to the first input of the eleventh gate, means connecting the output of the eighth gate to a first input of the twelfth gate, means connecting a first output of the flip-flop to a second input of the ninth gate and to a second input of the tenth gate, means connecting a second output of the flip-flop to a second input of the eleventh gate and to a second input of the twelfth gate, means connecting a first output of the counter to a second input of the flip-flop, means connecting a second output of the counter to a first input of the adder, means connecting a third output of the counter to the input of the decoder, means connecting the output of the ninth gate to a second input of the fifth register, means connecting the output of the eleventh gate to the second input of the fifth register, means connecting the output of the tenth gate to a second input of the sixth register, means connecting the output of the twelfth gate to the second input of the sixth register, means connecting the output of the fifth register to a first input of the comparator and to a second input of the adder, means connecting the output of the sixth register to a second input of the comparator, means connecting the output of the comparator to a second input of the counter, means connecting the output of the adder to a first input of the memory, means connecting a first output of the display control circuit to a second input of the memory, means connecting a second output of the display circuit to a second input of the symbol generator, means connecting a third output of the display control circuit to a second input of the display, means connecting the output of the memory to a first input of the symbol generator, means connecting the output of the symbol generator to a first input of the display.

* * * * *